United States Patent [19]

Manca et al.

[11] 3,809,178

[45] May 7, 1974

[54] CLAMSHELL EXHAUST NOZZLE AND SOUND DEFLECTOR

[75] Inventors: Michael E. Manca, Bellevue; Robert H. Drinnon, Kent, both of Wash.

[73] Assignee: The Boeing Company, Seattle, Wash.

[22] Filed: Apr. 30, 1973

[21] Appl. No.: 356,021

[52] U.S. Cl.......... 181/33 HC, 181/33 B, 181/33 E, 181/33 HD, 239/265.13, 239/265.19
[51] Int. Cl............................................... F01n 1/00
[58] Field of Search............ 181/33 B, 33 E, 33 HB, 181/33 HC, 33 HD; 239/265.13, 265.17, 265.19, 265.23, 265.33, 265.37

[56] References Cited
UNITED STATES PATENTS

| | | | |
|---|---|---|---|
| 2,625,008 | 1/1953 | Crook | 239/265.33 X |
| 3,174,282 | 3/1965 | Harrison | 181/33 HC UX |
| 3,583,640 | 6/1971 | MacDonald | 181/33 HC X |
| 3,637,042 | 1/1972 | Raynes | 181/33 E |

FOREIGN PATENTS OR APPLICATIONS

| | | | |
|---|---|---|---|
| 1,436,412 | 3/1966 | France | 181/33 HC |

*Primary Examiner*—Richard B. Wilkinson
*Assistant Examiner*—John F. Gonzales
*Attorney, Agent, or Firm*—H. Gus Hartmann; Glenn Orlob

[57] ABSTRACT

A sound suppression apparatus for a jet engine mounted in a nacelle wherein the exhaust nozzle duct comprises a variable ramp as the lower surface thereof and a pair of clamshell doors as the enclosure thereof. The clamshell doors are pivotally mounted about a longitudinal hinge on each side of the engine nacelle and when they are in the closed position, the interior surface of the duct, formed by the closed clamshell doors, conforms to the predetermined shape of the high speed cruise nozzle and externally, the shape of the doors conform to the configuration of the streamlined nacelle. When the clamshell doors are opened outwardly from the top, they form an upward opening exhaust nozzle with a pair of clamshell deflecting surfaces extending laterally outwardly and upwardly about the exhaust nozzle flow for the sound suppression mode of airplane operation during low speed flight of takeoff and landing.

19 Claims, 5 Drawing Figures

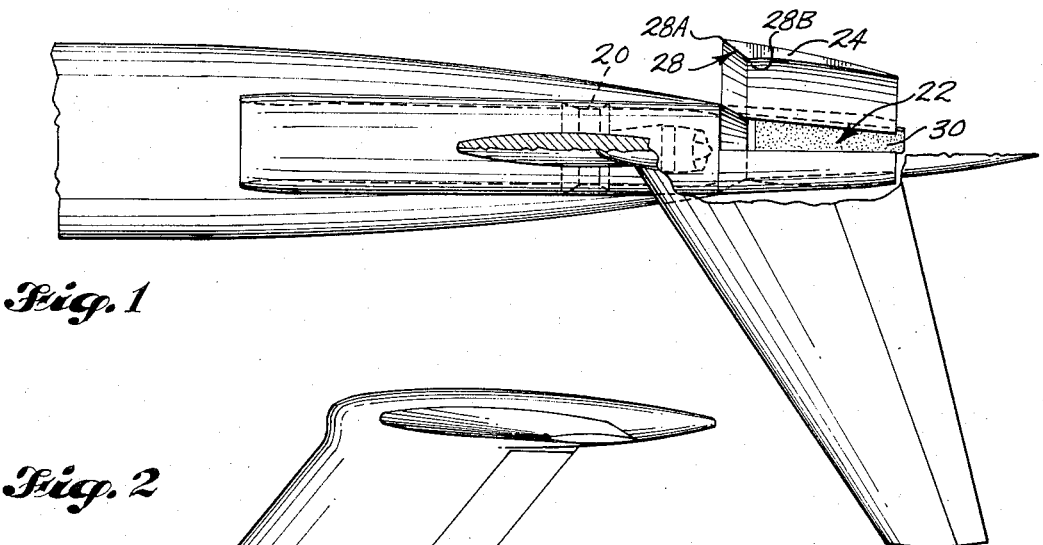
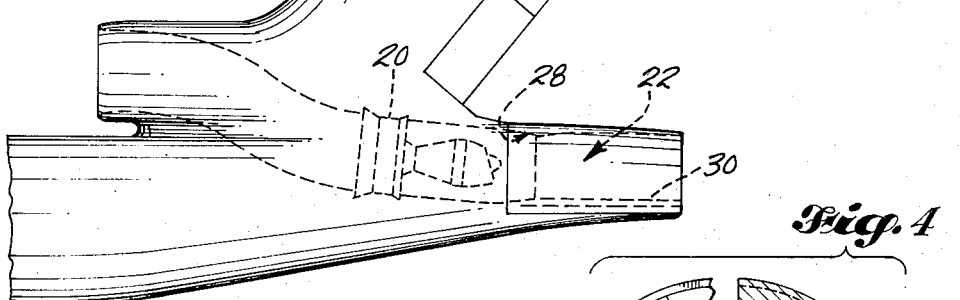
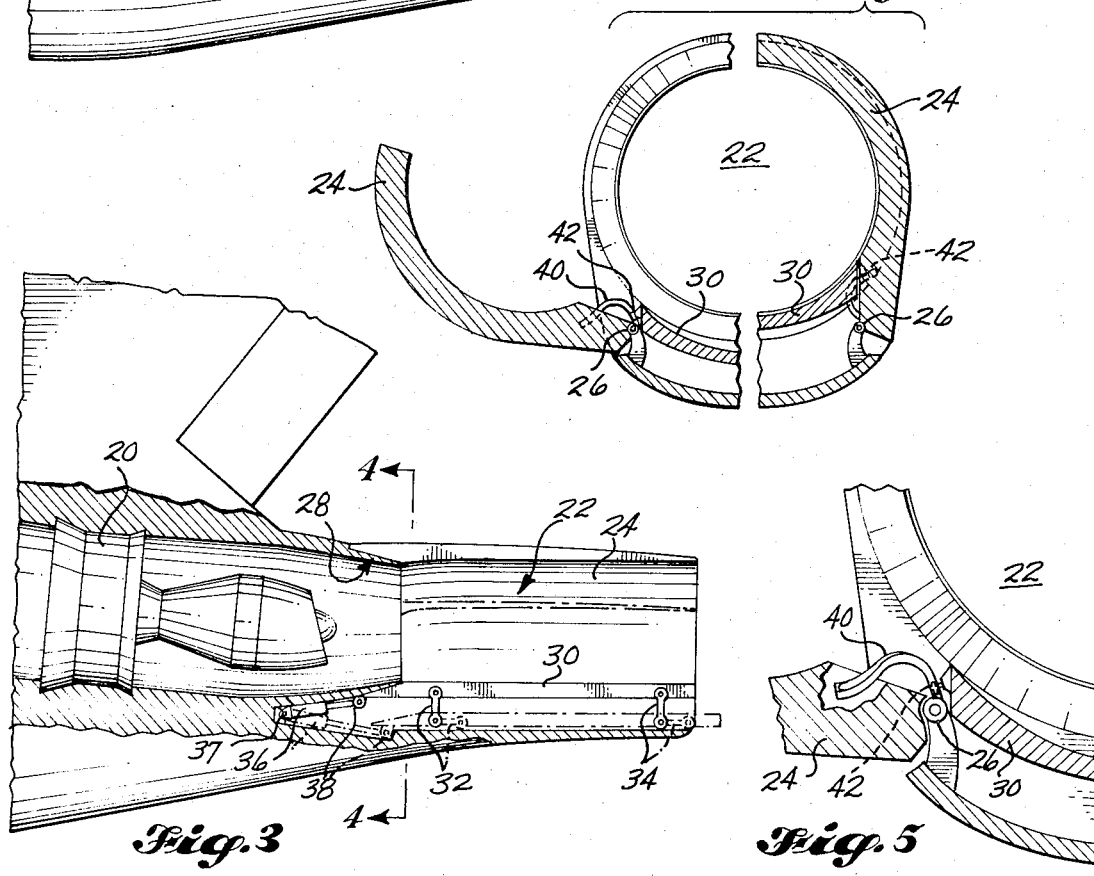

CLAMSHELL EXHAUST NOZZLE AND SOUND DEFLECTOR

Operating simultaneously with the opening of the clamshell doors, is a variable ramp which forms the lower surface of the exhaust nozzle duct. Through a cam track and roller interconnection, the ramp is lowered to a position such that its upper surface is aligned below the engine thrust flow so as to form a space therebetween. With the clamshell doors in the open position, they form a rearwardly converging pair of side panels, as seen in the plan view, which deflect the ambient airflow into the engine exhaust flow. Also, the leading edge of the clamshell doors has a scoop like shape for directing the streamwise airflow, adjacent to the external surface of the nacelle, sideways into the exhaust nozzle duct so as to come in underneath the jet engine propulsion flow as an intermediate fluid stream between the lower surface of the exhaust nozzle duct and the engine thrust flow. This injected intermediate flow produces a mixed boundary layer fluid throughout the length of the aft extending ramp surface and clamshell doors. This mixed boundary layer fluid detaches or deflects the engine thrust noise flow, which would normally follow the surface contour of the exhaust nozzle duct and spill over the end of the duct exit causing the noise flow to turn downwardly, so that it is turned upwardly, thereby, functioning as a noise shield for decreasing the downward noise emitted from the nozzle.

SUMMARY OF THE INVENTION

One of the problems confronting the operation of present jet aircraft, is the excessive noise over the community surrounding the airport, during takeoff, climb out, letdown and landing.

Through the present invention, the aircraft engine exhaust noise is shielded from the ground by reflecting it upwardly so that people on the ground don't hear it. Generally, there is little concern about the noise emitted upwards from the airplane. So, by properly locating a noise shield device beneath the jet engine exhaust flow, the noise can be deflected upward. Further, the noise energy of the exhaust flow can be reduced by introducing an intermediate flow between the exhaust flow and the lower surfaces of the exhaust nozzle and noise shield device. This injected intermediate fluid flow causes a mixed boundary layer region that lowers the engine exhaust noise energy beneath the engine thrust flow and functions to reflect the noise upwards with respect to the aircraft.

More particularly, the invention relates to a jet engine mounted in a nacelle wherein a pair of clamshell panels form the exhaust nozzle duct when they are in the closed position. The clamshell panels are pivotally mounted about a longitudinal hinge line on each side of the nacelle. When deployed, they open outwardly from the top and extend on each side of the nacelle. When the clamshell panels are in the closed position they substantially comprise the sides and upper surface of the exhaust nozzle duct. Therefore, when they are in the open position, they form an upward opening exhaust nozzle. Also, in the open position, their leading edge has a scoop-like shape which deflects the airstream flow adjacent to the nacelle, into the engine exhaust flow. Operating in combination with the clamshell panels is a variable ramp; which comprises the lower surface of the exhaust nozzle duct. Through a cam track and roller interconnection, the ramp is lowered simultaneously with the opening of the clamshell panels. This lowering of the ramp, permits the Airstream flow which has been deflected by the panels, to be directed in underneath the exhaust flow from the jet engine. This intermediate fluid forms a mixed flow region or boundary layer between the engine flow containing the noise and the aft extending ramp surface, including the adjacent clamshell panels. This boundary layer region functions to prevent the engine noise from impinging on and following the surfaces of the ramp and adjacent clamshell panels, thereby causing them to function as a deflecting noise shield for turning the sound upwardly. Unless this intermediate flow is introduced beneath the engine exhaust flow, the engine noise contained in the flow would not be deflected upwardly but would follow the contours of the ramp and clamshell panels by sticking right to their surfaces and spilling or coming off over their aft terminus as if there were nothing there to shield or deflect the noise from radiating downwardly.

For example, when you hold a megaphone up to your mouth, it is very effective because the voice follows right down the side surface of the megaphone. But, if you hold it away from your mouth, it is nowhere near as effective. Therefore, in order to suppress the noise in the shortest possible length, so that it will be reflected upwards and not follow the surface of the shield like a megaphone and come off the end, it is necessary to scoop and pump the ambient or streamwise flow of air into and under the engine thrust flow containing the noise.

When the clamshell panels are opened to extend laterally on each side of the nacelle, they may aerodynamically work against the horizontal stabilizer if they are not properly designed. However, due to the relatively small area required by the clamshell panels to be effective as a noise shield (with the injection of the intermediate flow) in comparison with the area of the horizontal stabilizer, the effectiveness of the clamshell panels as a destabilizing influence can be neglected at the relatively slow aircraft speeds during takeoff and landing. For cruise flight speeds, however, it would be necessary to close the clamshell panels in order to affect as little as possible the aerodynamic action of the horizontal stabilizer. Also, when the clamshell panels are in the closed position, they are internally adapted to form the cruise nozzle. Generally, for aircraft operational efficiency the high bypass ratio engines require a different shaped exhaust nozzle for landing or takeoff than they do for cruise flight speeds. Therefore, a translating plug type nozzle, or movable segmented flap elements in the wall of the nozzle, or similar means, are used to provide the dual nozzle function. Whereas, in the present invention, the clamshell panels not only provide for noise deflection but also perform the dual function of forming the required nozzle shape for takeoff and landing, and the shape for cruise flight speeds.

Another advantage of the present invention is that it reasonably provides approximately 15 percent noise reduction, whether it is incorporated into a high bypass ratio engine or a low bypass ratio engine. Although the actual dimensions may have to be somwhat different, the proportions of noise shield size relative to exhaust nozzle diameter, etc., as set forth infra, would be equally applicable to either a high or a low bypass ratio engine.

BRIEF DESCRIPTION OF THE DRAWINGS

FIG. 1 is a plan view of a high bypass turbofan engine mounted in the tail portion of an aircraft fuselage having a T-tail and an air inlet duct on top of the fuselage. In the upper portion of the figure, the horizontal stabilizer has been removed to more clearly show the noise shield device in the extended position;

FIG. 2 is a side elevational view of FIG. 1 and shows the clamshell panels or noise shield device in the closed position on the side of the fuselage;

FIG. 3 is an enlarged side elevational view similar to FIG. 2 showing the exhaust duct in longitudinal cross-section and schematically depicting the actuation and linkage mechanism for raising and lowering the ramp;

FIG. 4 is a cross-sectional view taken at 4—4 of FIG. 3 and shows in its left half: the clamshell panel extended on the side of the fuselage in combination with the cam track and roller interconnection with the ramp in the lower position; and in its right half: the clamshell panel in its closed position and the ramp raised to its cruise flight position;

FIG. 5 is an enlarged detail view of the cam track and roller interconnection with the ramp in the lower position as shown in the left half view of FIG. 4.

DESCRIPTION OF THE PREFERRED EMBODIMENTS

FIG. 1, is a plan view of the sound suppression apparatus of the present invention as installed on a high bypass turbojet engine 20 which is mounted in the tail portion of an aircraft fuselage. The thrust flow from the engine exhausts through a nozzle duct 22, which comprises a pair of clamshell panels, or doors 24. As shown in FIG. 4, the doors are longitudinally hinged at 26 along the side of the engine nacelle or the tail of the fuselage. The operating mechanism for the clamshell doors 24 is shown in the side view of FIG. 3 and in the cross-sectional view of FIG. 4. The lower surface of the exhaust nozzle duct 22 comprises a vertically adjustable surface or variable ramp 30 that is connected to nacelle structure through links 32 and 34 which are arranged to form a parallel linkage support mechanism through which the ramp is raised and lowered by actuator 36. One end of actuator 36 is connected to nacelle structure at 37 and the other end is connected to the ramp 30 at 38. In operation, extension of linear actuator 36 moves the ramp 30 aft and down through the parallel linkage support 32, 34 and this downward movement of the ramp 30 simultaneously opens the clamshell doors 24 through a cam track 40 and roller 42 interconnection. The cam track 40 is fixed to the lower inner edge of the clamshell door 24 adjacent to its pivotal connection 26; and the roller 42, which is in engagement with the cam track 40, is fixed to the side of the ramp 30.

During cruise flight speeds of the airplane, the variable ramp 30 is in the raised position, as shown in the right half of FIG. 4, and the clamshell doors 24 are closed. In this position, they internally form the predetermined shape of an efficient high speed cruise nozzle. The ramp 30 in cross-section, as shown in FIG. 4, has raised sides on it and the upper surface is so shaped that it will present a round choked exhaust nozzle when in the raised cruise flight position. A round nozzle is more efficient. However, the ramp 30 could be shaped so as to be flat from wall to wall, thereby forming a D-shaped nozzle.

During low speed flight of the airplane, such as takeoff and landing, the variable ramp 30 is lowered, as shown in the left half of FIG. 4, and the clamshell doors 24 are in the open or laterally extended position. When the clamshell doors are opened outward from the nacelle, their leading edge forms a scoop 28 which functions to direct the free airstream into the exhaust flow. Also, as more clearly seen in the plan view of FIG. 1, the vertical section or sides of the clamshells converge in the aft direction which adds to the scooping action or inward deflection of the free airstream when the clamshells are deployed outwardly. Further, since the interior surface of the clamshells forms the duct of the exhaust nozzle when closed, therefore, when opened, for the sound suppression mode of airplane operation, they form an upward opening exhaust nozzle. It is necessary that the ramp 30 be lowered far enough below the engine thrust flow or below an aft extending cross-sectional profile of the exhaust flow through duct 22 so that the clamshell doors 24 can scoop the free airstream flow into and underneath the engine thrust flow which contains the noise. This creates an intermediate fluid flow or mixed boundary layer region between the engine thrust flow and the surfaces of the aft extending ramp and clamshell doors. This intermediate fluid flow is formed to separate or reflect the engine and turbofan noise contained in the thrust flow so that it won't follow the contour of the aft extending surfaces of the ramp and clamshell doors. In this manner the noise is suppressed throughout the length of the ramp and clamshell members, and deflected upwardly of the aircraft.

The size of the clamshell panels 24 or the noise shield deflecting area, when in the extended open position, is proportional to the diameter of the jet exhaust nozzle. The noise shield is approximately 3 diameters long and 3 diameters wide. In order to reduce side line noise, the shield should have some vertical deflecting areas and as seen in FIG. 4, the clamshell panels 24 when in the open position, cover up approximately 50 percent or more of the nozzle's height. For additional side line noise shielding, vertical panels (not shown) may be attached to the nacelle on either side and outboard of the clamshell panels, or a second set of clamshell panels (not shown) hinged longitudinally along the upper portion of the nacelle and functioning to close in an overlapping relation with the lower hinged panels 24 may be utilized. In the upper half of the plan view of FIG. 1, the clamshell 24 has a scoop type leading edge 28 which in turn has its leading edge 28A adjacent to or at the outer surface of the nacelle wall and its trailing edge 28B adjacent to or at the inner nacelle wall. The biased surface between the leading edge 28A and the trailing edge 28B forms the leading edge scoop 28. The leading edge 28A of this biased surface projects forward of the nozzle side opening by a distance of approximately one-fourth of the nozzle diameter, for both the sideline noise shielding and under the nozzle noise shielding. From a rear view or the cross-sectional view of FIG. 4, the clamshell panels 24 when in the extended or open position, their vertical surface portion should be located adjacent to the side of the nozzle at a distance of approximately one nozzle diameter. Also, the inner or hinged edge 26 of the clamshell panels 24 or their intersection with exhaust nozzle, should be such as to permit a clear area under the exhaust flow 22 of a clearance height of approximately one-fourth nozzle diameter. This is to permit the introduction of the free airstream flow under the exhaust flow (containing the jet engine noise) and thereby reflect the noise upwardly. As indicated in the right and left half view of FIG. 4, the ramp 30 which forms the lower surface of the exhaust nozzle when the ramp is in the up position, has to be moved downward a predetermined distance of approximately one-fourth nozzle diameter as shown in the left half of FIG. 4 in order that the intermediate free airstream flow can be directed under the engine thrust nozzle flow from duct 22.

While the invention has been disclosed with reference to a preferred embodiment, it is to be understood that those modifications and changes which become obvious to a person skilled in the art as a result of the teachings hereof, will be encompassed by the following claims:

What is claimed is:

1. Apparatus for suppressing the exhaust flow noise from the exhaust duct of a jet engine mounted in a nacelle, comprising:
   a panel pivotally mounted on each side of the nacelle along the lower surface thereof and forming the upper enclosure of the exhaust duct;
   means for extending the panels outwardly from the nacelle to form an upward opening exhaust nozzle with the panels extending outwardly and upwardly about the exhaust flow for providing a shield to deflect the engine exhaust noise upwardly.

2. The apparatus as set forth in claim 1, wherein said panels direct the ambient airstream flow adjacent the nacelle, beneath the engine exhaust flow to form an intermediate mixed boundary layer between the engine exhaust flow and the panels for suppressing the downward noise radiation.

3. The apparatus as set forth in claim 1, wherein said panels have a scoop-like leading edge for picking up the free airstream flow adjacent the nacelle and directing it in underneath the engine exhaust flow, so as to form an intermediate mixed boundary layer flow, for suppressing the downward radiation of the engine exhaust sound waves.

4. The apparatus as set forth in claim 1, further comprising:
   a variable ramp within the engine exhaust duct and extending aft of the jet exhaust nozzle exit, when the panels are opened outwardly from the nacelle, for discharge of the exhaust nozzle flow thereover;
   means for lowering the variable ramp surface to increase the nozzle exhaust exit area for the sound suppression mode.

5. The apparatus as set forth in claim 1 wherein said panels have an upwardly extending vertical surface portion set at an angle of incidence with respect to the longitudinal axis of the nacelle for scooping free airstream flow adjacent to the nacelle into and underneath the engine exhaust flow, so as to form an intermediate mixed boundary layer flow between the exhaust flow and the panels, for suppressing the downward radiation of engine exhaust noise.

6. A sound deflecting apparatus for the exhaust flow from the duct of a jet engine exhaust nozzle, comprising
   a panel mounted longitudinally along each side of the exhaust duct and forming part of the duct wall;
   means for deploying the panels outwardly on each side of the exhaust nozzle so as to form an upwardly opening exhaust nozzle exit;
   said panels when deployed, extend outwardly and upwardly to provide a deflecting shield against the downward radiation of the engine exhaust noise.

7. A sound deflecting apparatus for the exhaust flow from the duct of a jet engine exhaust nozzle comprising:
   a pair of panels mounted longitudinally along the side of the exhaust duct and forming part of the duct wall;
   means for extending the panels outwardly on each side of the exhaust nozzle so as to form an upwardly opening exhaust duct;
   a scoop on the leading edge of the panels for directing free airstream flow in underneath the exhaust flow so as to form an intermediate mixed boundary layer flow between the lower surface of the exhaust nozzle duct and the engine exhaust flow, for suppressing the downward radiation of the engine exhaust noise.

8. Apparatus for suppressing the exhaust flow noise from the exhaust duct of a jet engine mounted in the tail section of an airplane fuselage, comprising:
   a panel pivotally mounted along each side of the fuselage tail section and forming the upper enclosure of the exhaust duct;
   means for opening the panels to extend outwardly from the fuselage to form an upward opening exhaust nozzle with the panels extending laterally outwardly and upwardly about the exhaust flow for providing a shield to deflect the engine exhaust noise upwardly.

9. The apparatus as set forth in claim 8 wherein said panels direct the ambient airstream flow adjacent the fuselage tail section, beneath the engine exhaust flow to form an intermediate mixed boundary layer between the engine exhaust flow and the panels for suppressing the downward noise radiation.

10. The apparatus as set forth in claim 8, wherein said panels have a scoop like leading edge for picking up the free airstream flow adjacent the fuselage tail section and directing it in underneath the engine exhaust flow, so as to form an intermediate mixed boundary layer flow between the engine exhaust flow and the panels, for suppressing the downward radiation of the engine exhaust sound waves.

11. The apparatus as set forth in claim 8, further comprising:
   a variable ramp within the engine exhaust duct and extending aft of the jet exhaust nozzle exit, when the panels are opened outwardly from the fuselage, for discharge of the exhaust nozzle flow thereover;
   means for lowering the variable ramp surface to increase the nozzle exhaust exit area for the sound suppression mode.

12. The apparatus as set forth in claim 8 wherein said panels have an upwardly extending vertical surface portion set at an angle of incidence with respect to the longitudinal axis of the fuselage for scooping free airstream flow adjacent to the fuselage into and underneath the engine exhaust flow, so as to form an intermediate mixed boundary layer flow between the exhaust flow and the panels for suppressing the downward radiation of engine exhaust noise.

13. A sound suppression apparatus for a jet engine exhaust duct in the tail portion of an aircraft fuselage comprising:
- a pair of clamshell doors hinged longitudinally along the side of the exhaust duct and forming part of the duct wall;
- means for outwardly extending the clamshell doors on each side of the fuselage tail portion so as to form an upwardly opening exhaust duct for deflecting the engine exhaust sound upwardly of the aircraft.

14. A sound suppression apparatus for a jet engine having an exhaust duct comprising:
- a pair of clamshell doors forming the sides and upper enclosure of the exhaust duct, and pivotally mounted along the lower surface of the exhaust duct;
- means for opening the clamshell doors outwardly from the top of the exhaust duct to form an upward opening exhaust nozzle with the pair of clamshell doors forming surfaces extending laterally outwardly and upwardly about the exhaust nozzle flow for providing a shield to deflect the engine exhaust noise upwardly.

15. The apparatus as set forth in claim 14, wherein said clamshell doors direct the ambient airstream flow adjacent the exhaust duct beneath the engine exhaust flow to form an intermediate mixed boundary layer between the engine exhaust flow and the clamshell doors for suppressing the downward noise radiation.

16. The apparatus as set forth in claim 14, wherein said clamshell doors have a scoop-like leading edge for picking up the free airstream flow adjacent the exhaust duct and directing it in underneath the engine exhaust flow, so as to form an intermediate mixed boundary layer flow between the engine exhaust flow and the panels, for suppressing the downward radiation of the engine exhaust sound waves.

17. The apparatus as set forth in claim 14, further comprising:
- a variable ramp within the engine exhaust duct and extending aft of the jet exhaust nozzle exit, when the clamshell doors are opened outwardly, for discharge of the exhaust nozzle flow thereover;
- means for lowering the variable ramp surface to increase the nozzle exhaust exit area for the sound suppression mode.

18. The apparatus as set forth in claim 14, wherein said clamshell doors have an upwardly extending vertical surface portion set at an angle of incidence, with respect to the longitudinal axis of the exhaust duct, for scooping free airstream flow adjacent to the exhaust duct into and underneath the engine exhaust flow, so as to form an intermediate mixed boundary layer flow between the exhaust flow and the clamshell doors for suppressing the downward radiation of engine exhaust noise.

19. Apparatus for suppressing the sound of the exhaust nozzle flow from a jet engine mounted in a aircraft wherein the nozzle flow discharges over an aft extending variable ramp surface having a raised cruise flight position, and a lowered takeoff and landing position, comprising:
- a panel pivotally mounted on each side of the exhaust nozzle along the lower section thereof and forming the upper section enclosure of the exhaust nozzle;
- said panels being positioned vertically on each side of the exhaust nozzle so as to intersect the exhaust nozzle exit plane below the raised cruise flight position of the variable ramp;
- means for extending the panels outwardly on each side of the exhaust nozzle so as to form an upwardly opening exhaust duct;
- said panels having an upwardly extending vertical portion set at an angle of incidence with respect to the longitudinal axis of the aircraft for scooping up atmospheric airflow adjacent to the exhaust nozzle and directing it into the increased nozzle exit area due to the lowering of the variable ramp surface for the sound suppression mode so as to form an intermediate mixed boundary layer flow between the engine exhaust flow and the ramp surface for suppressing the downward radiation of the engine exhaust noise during takeoff and landing of the aircraft.

* * * * *